United States Patent [19]
Duffy

[11] Patent Number: 5,737,160
[45] Date of Patent: Apr. 7, 1998

[54] ELECTRICAL SWITCHES COMPRISING ARRANGEMENT OF MECHANICAL SWITCHES AND PCT DEVICE

[75] Inventor: Hugh Duffy, Cupertino, Calif.

[73] Assignee: Raychem Corporation, Menlo Park, Calif.

[21] Appl. No.: 564,495

[22] Filed: Nov. 29, 1995

Related U.S. Application Data

[60] Provisional application No. 60/003,743 Sep. 14, 1995.

[51] Int. Cl.[6] ............................................. H02H 3/00
[52] U.S. Cl. ............................. 361/3; 361/9; 361/58
[58] Field of Search ................... 361/2, 3, 5–10, 361/13, 58, 93; 338/22 R; 324/417, 418, 419, 422–424

[56] References Cited

U.S. PATENT DOCUMENTS

| | | | |
|---|---|---|---|
| 3,241,026 | 3/1966 | Andrich | 318/442 |
| 3,249,810 | 5/1966 | Strom et al. | 317/11 |
| 3,488,761 | 1/1970 | Ito et al. | 337/221 |
| 4,070,641 | 1/1978 | Khalid | 338/61 |
| 4,071,836 | 1/1978 | Cook et al. | 335/195 |
| 4,237,441 | 12/1980 | van Konynenburg et al. | 338/22 |
| 4,238,812 | 12/1980 | Middleman et al. | 361/106 |
| 4,315,237 | 2/1982 | Middleman et al. | 338/22 R |
| 4,317,027 | 2/1982 | Middleman et al. | 219/553 |
| 4,426,633 | 1/1984 | Taylor | 338/25 |
| 4,445,079 | 4/1984 | DeFilippis et al. | 318/792 |
| 4,485,283 | 11/1984 | Hurtle | 200/144 R |
| 4,545,926 | 10/1985 | Fouts et al. | 252/511 |
| 4,583,146 | 4/1986 | Howell | 361/13 |
| 4,689,475 | 8/1987 | Kleiner et al. | 219/553 |
| 4,724,417 | 2/1988 | Au et al. | 338/22 R |
| 4,724,504 | 2/1988 | Prouty | 361/165 |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,808,965 | 2/1989 | Cenky | 337/408 |
| 4,816,958 | 3/1989 | Beibel et al. | 361/93 |
| 4,845,838 | 7/1989 | Jacobs et al. | 29/671 |
| 4,847,719 | 7/1989 | Cook et al. | 361/13 |

(List continued on next page.)

FOREIGN PATENT DOCUMENTS

| | | |
|---|---|---|
| 872089 | 3/1979 | Belgium . |
| 2019925 | 12/1990 | Canada . |
| 0424283 | 4/1991 | European Pat. Off. . |
| 2653593 | 4/1991 | France . |
| 2928786 | 5/1981 | Germany . |
| 3544647 | 6/1987 | Germany . |
| 59-46730 | 3/1984 | Japan . |
| 59-49127 | 3/1984 | Japan . |
| 61-22719 | 1/1986 | Japan . |
| 61-22720 | 1/1986 | Japan . |
| 4-351825 | 12/1992 | Japan . |
| 5-6720 | 1/1993 | Japan . |
| 5-6723 | 1/1993 | Japan . |
| 5-6725 | 1/1993 | Japan . |
| 1172718 | 1/1988 | United Kingdom . |
| WO93/07667 | 4/1993 | WIPO . |

*Primary Examiner*—Jeffrey A. Gaffin
*Assistant Examiner*—Michael Sherry
*Attorney, Agent, or Firm*—Herbert G. Burkard

[57] ABSTRACT

An electrical switch arrangement, comprising a first mechanical switch, a second mechanical switch and a PTC device, with (a) the PTC device and second switch connected in parallel and the parallel combination connected in series with the first switch, or (b) the PTC device and first switch connected in series and the series combination connected in parallel with the second switch. The arrangement can interrupt a current and voltage higher than the rated currents and voltages of each of the switches and the PTC devices. The parallel switch can be rated to interrupt the rated interrupt current of the electrical switch arrangement at a voltage below the rated voltage of the electrical switch arrangement, and the series switch can be rated to interrupt a current below the rated interrupt current of the electrical switch arrangement at the rated voltage of the electrical switch arrangement.

17 Claims, 3 Drawing Sheets

U.S. PATENT DOCUMENTS

| | | | |
|---|---|---|---|
| 4,857,880 | 8/1989 | Au et al. | 338/22 R |
| 4,859,836 | 8/1989 | Lunk et al. | 219/548 |
| 4,901,186 | 2/1990 | Tennant et al. | 361/106 |
| 4,907,340 | 3/1990 | Fang et al. | 29/610.1 |
| 4,910,631 | 3/1990 | Murphy | 361/96 |
| 4,924,074 | 5/1990 | Fang et al. | 219/548 |
| 4,935,156 | 6/1990 | van Konynenburg et al. | 219/553 |
| 4,967,176 | 10/1990 | Horsma et al. | 338/22 R |
| 5,049,850 | 9/1991 | Evans | 338/22 R |
| 5,089,801 | 2/1992 | Chan et al. | 338/22 R |
| 5,254,816 | 10/1993 | Shutoh et al. | 200/144 |
| 5,305,174 | 4/1994 | Morita et al. | 361/63 |
| 5,378,407 | 1/1995 | Chandler et al. | 252/513 |
| 5,428,195 | 6/1995 | Arnold | 218/1 |

ELECTRICAL SWITCHES COMPRISING ARRANGEMENT OF MECHANICAL SWITCHES AND PCT DEVICE

RELATED APPLICATIONS

This application is an application under 35 USC 111(a) and claims priority under 35 USC 119(e) from Provisional application Ser. No. 60/003,743, filed Sep. 14, 1995 under 35 USC 111(b).

This application is related to copending, commonly assigned provisional application Ser. No. 60/003,733, filed Sep. 14, 1995 under 35 USC 111(b), copending, commonly assigned provisional application Ser. No. 60/003,732, filed Sep. 14, 1995 under 35 USC 111(b); and copending, commonly assigned provisional application Ser. No. 60/003,731, filed Sep. 14, 1995 under 35 USC 111(b), the disclosures of which are incorporated herein by reference for all purposes.

This application is related to copending, commonly assigned U.S. patent application Ser. No. 08/564,465, copending commonly assigned U.S. patent application Ser. No. 08/564,831, and copending commonly assigned U.S. patent application Ser. No. 08/564,457 which are being filed on the same day as this application, the disclosures of which are incorporated herein by reference for all purposes.

BACKGROUND OF THE INVENTION

1. Field of the Invention

This invention relates to electrical switches.

2. Introduction to the Invention

Mechanical switches are widely used to control the flow of current in electrical circuits. The term "mechanical switch" is used herein to denote an electrical switch which comprises mechanical contacts which open or close in response to a mechanical (including manual), electrical, thermal or other form of activation. Such devices include simple manual switches, circuit breakers, Ground Fault Interrupts (GFIs), relays, and bimetal devices (also referred to as electrothermal relays, thermally activated switches and electro-thermal devices).

When a mechanical switch is operated to interrupt current flowing through it, arcing nearly always occurs between the contacts as they separate, even under normal operating conditions, and current (in the form of an arc) continues to flow through the switch until the arc is extinguished. The arc will damage the contacts to an extent which depends upon the current, the voltage, whether the current is AC or DC, the speed at which the contacts separate, and the material of which the contacts are made. A mechanical switch is usually rated according to the maximum current that it can safely interrupt at a stated AC or DC voltage and for a stated number of operations. The cost, size, and complexity of a switch increase sharply as the rating of the switch increases.

Standard procedures for rating switches usually involve testing at different standard current levels at a particular voltage. A switch is rated at the highest of the standard current levels at which it will pass the test. For example, if one of the standard current levels is 15 amps (at 120 volts) and the next higher standard current level is 20 amps (at 120 volts), a switch rated at 15 amps will pass at 15 amps and fail at 20 amps, and may or may not pass at a non-standard current between 15 and 20 amps.

Standards for rating electrical switches include, e.g., three published by the Underwriters Laboratories: UL20, Standard for General-Use Snap Switches, Eleventh Edition, May 25, 1995; UL508, Standard for Industrial Control Equipment, Sixteenth Edition, Sep. 20, 1994; and UL1054, Standard for Special-Use Switches, Fifth Edition, May 20, 1995.

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tipped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example, in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

Under normal operating conditions of the circuit, a PTC circuit protection device is in a low temperature, low resistance state. However, if a fault occurs (eg. if the current through the PTC device increases excessively, and/or the ambient temperature around the device increases excessively, and/or the normal operating current.is maintained for more than the normal operating time), then the PTC device will be "tripped", i.e. converted into a high temperature, high resistance state such that the current in the circuit is reduced to a safe level. Generally, the PTC device will remain in the tripped state, even if the fault is removed, until the device has been disconnected from the power source and allowed to cool.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are substantially the same. However, in this specification, reference is made to a PTC device having an $I_{PASS}$ and a different $I_{TRIP}$, because as a practical matter, the manufacturer of an electrical switch must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

SUMMARY OF THE INVENTION

I have been investigating the behavior of electrical switching arrangements which comprise two mechanical switches in series or in parallel, and a PTC device which is in parallel with one of the switches (referred to herein as "the parallel switch") and in series with the other switch (referred to herein as "the series switch"). I have discovered that if the two switches are operated at substantially the same time, or the series switch is operated shortly after the parallel switch, when a current $I_{SWITCH}$ is passing through the arrangement at an applied voltage $V_{SWITCH}$, the parallel switch interrupts a current $I_{SWITCH}$ at a voltage substantially less than $V_{SWITCH}$, and that as a result of the increase in resistance of PTC device, the series switch interrupts a current substantially less than $I_{SWITCH}$ at a voltage which is a little less than the voltage $V_{SWITCH}$. It is, therefore, possible for either or both of the switches to have a rating of less than $I_{SWITCH}$ at the voltage $V_{SWITCH}$ (or, putting it alternatively that it is possible for either or both of the switches to have a rating $I_{SWITCH}$ at a voltage less than $V_{SWITCH}$. Such a switching arrangement can, therefore, be cheaper and/or more reliable than a single conventional switch which will interrupt the current $I_{SWITCH}$ at the voltage $V_{SWITCH}$. I have also discovered that this effect is related to the electrical and thermal characteristics of the PTC device, and that in many cases, the best results are obtained when the PTC device contains a PTC element composed of a material having a resistivity of less than 10 ohm-cm at room temperature. PTC conductive polymers having such resistivities are readily available.

These discoveries can be used to provide switching arrangements which switch a circuit on and off in normal use of the circuit, the switches being operated manually or in response to a condition which arises in normal use of the circuit. They can also be used to provide fault protection systems, the switches then being operated indirectly by the fault condition. For further details of such fault protection systems, reference should be made to the commonly assigned applications, Provisional U.S. patent application Ser. Nos. 60/003,733 60/003,732 and 60/003,731, and U.S. patent application Ser. Nos. 08/564,465, 08/564,831, and 08/564,457 filed on the same day as this application, the entire disclosures of which are incorporated herein by reference. Moreover, in the switching arrangements of this invention, the PTC device limits the energy passed to the load during the switching operation. This feature provides the "fault current limiting" characteristics disclosed in the referenced applications.

The resistance of the PTC device must be increased substantially by the current which passes through the device when the parallel switch is opened. Furthermore, the speed at which the resistance increases has an important influence on the design of the arrangement. If both switches are operated simultaneously, the current will continue to flow through the series switch, in the form of an arc between the contacts as they separate, until the increasing resistance of the PTC device reaches a level such that the arc is not sustained. Therefore, the more quickly the resistance of the PTC device reaches that level, the lower the required rating of the series switch. If the series switch is operated after the parallel switch, this will reduce the duration of the arcing in the series switch, and may eliminate the arcing completely. Thus, if the resistance of the PTC device reaches the required level before the series switch is operated, there will be no arcing in the series switch. This is ideal for the series switch, but the cost of ensuring the desired delay may outweigh the desirability of using a switch having a low rating. Since, in AC circuits, the arcing (if any) ceases at each current zero, there is generally no reason to delay operation of the series switch if the PTC devices reaches the required resistance in less than one half cycle. It should also be remembered that if the series switch is not operated as soon as the resistance of the PTC device reaches the required level, then the PTC device must be such that it can sustain its high temperature state, without damage to itself or any other component, until the series switch is operated. It is also desirable that the series switch should open and/or be operated not more than 100 milliseconds after the parallel switch, in order to ensure that the circuit is not live for an appreciable time after the parallel switch has been operated.

A PTC device is normally designated as being suitable for use at a particular current (or range of currents) and at a particular voltage (or range of voltages), with these designations being based upon the requirement that the PTC device should trip safely under those conditions. An important advantage of the present invention is that because the current passes through the PTC device for only a limited time (i.e. between the time of operation of the parallel switch and the time when current ceases to flow), and the PTC device does not usually reach the very high resistance of it normal "tripped" state, the PTC device does not need to have the properties normally associated with a PTC device which operates at $I_{SWITCH}$ and $V_{SWITCH}$. As a result, the switching arrangements of this invention can be sued to interrupt currents and voltages much higher than those normally associated with PTC devices. If $I_{SWITCH}$ and/or $I_{VOLTAGE}$ are high, the mount of energy absorbed by the PTC device is correspondingly high.

In a first aspect, this invention provides an electrical switch arrangement which comprises (1) a first mechanical switch,
(2) a second mechanical switch and
(3) a PTC device;

with
(a) the PTC device and second switch connected in parallel and the parallel combination connected in series with the first switch, or
(b) the PTC device and first switch connected in series and the series combination connected in parallel with the second switch;

the arrangement, when rated by a defined procedure in which both switches are operated simultaneously to interrupt a current $I_{SWITCH}$ in a circuit operating at a voltage $V_{SWITCH}$; at least one of (a) the first switch, when rated on its own by the same procedure at the voltage $V_{SWITCH}$ having a rated current $I_{FIRST}$ which is at most j times $I_{SWITCH}$, where j is 0.8, preferably 0.6, particularly 0.25, especially 0.1; and
(b) the parallel switch, when rated on its own by the same procedure at a voltage $V_{SECOND}$ which is at most k times $V_{SWITCH}$, where k is 0.8, preferably 0.6, particularly 0.25, especially 0.1, having a rated current $I_{SECOND}$ which is at most $I_{SWITCH}$; and the PTC device, when tested in a test circuit whose open circuit voltage across the terminals to which the PTC device is connected, were the PTC device to be removed from the test circuit, would be $V_{SWITCH}$, requiring a current, $I_{PTC}$, through it of no more than m times $I_{SWITCH}$, where m is 0.75, preferably 0.5, particularly 0.25, especially 0.1, to cause its resistance to increase by a factor of at least 100, preferably at least 200, particularly at least 700, especially at least 1000, in a resistance increase time of at most 100 milliseconds, preferably at most 30 milliseconds, particularly at most 8 milliseconds, especially at most 5 milliseconds.

In a second aspect, this invention provides an electrical switch arrangement which comprises (1) a first mechanical switch,
(2) a second mechanical switch, and
(3) a PTC device;

with (a) the PTC device and second switch connected in parallel and the parallel combination connected in series with the first switch, or
(b) the PTC device and first switch connected in series and the series combination connected in parallel with the second switch;

the switch arrangement having at least one of the following characteristics (A) the PTC device includes a PTC element which is composed of a PTC conductive polymer having a resistivity of less than 5 ohm-cm;
(B) the switches are ganged together so that the series switch can be operated at the same time as the parallel switch;
(C) the arrangement includes means for operating the series switch at a predetermined time which is 10 to 100 milliseconds after the parallel switch has been operated, the predetermined time being determined by the characteristics of the PTC device and the two switches;
(D) the parallel switch is not operated by an overcurrent passing through the arrangement;
E) the parallel switch can be operated manually;
(F) the series switch, the parallel switch, the PTC device, and any other component of the switch arrangement each has a resistance which changes by a factor of at most 5, preferably at most 4, particularly at most 2, especially at most 1.2, when the voltage changes from 10 to 600 volts; and
(G) the PTC device, when tested in a circuit whose open circuit voltage across the terminals to which the PTC device is connected, were the PTC device to be removed from the test circuit, would be $V_{PTC}$, increasing in resistance by a factor of at least 100, preferably at least 200, particularly at least 700, especially at least 1000, in a resistance increase time of at most 100 milliseconds, preferably at most 30 milliseconds, particularly at most 8 milliseconds, especially at most 5 milliseconds, with a current through the PTC device of $I_{PTC}$, where $I_{PTC}$ and $V_{PTC}$ are selected from the following combinations (i) $V_{PTC}$ is 12 volts AC, and $I_{PTC}$ is 1, 3, 5, 10, 15, 20, 30 or 60 amps,
(ii) $V_{PTC}$ is 24 volts AC, and $I_{PTC}$ is 1, 3, 5, 10, 15, 20, 30 or 60 amps,
(iii) $V_{PTC}$ is 60 volts AC, and $I_{PTC}$ is 1, 3, 5, 10, 15, 20, 30 or 60 amps,
(iv) $V_{PTC}$ is 120 volts AC, and $I_{PTC}$ is 1, 3, 5, 10, 15, 20, 30 or 60 amps,
(v) $V_{PTC}$ is 250 volts AC, and $I_{PTC}$ is 1, 3, 5, 10, 15, 20, 30 or 60 amps,
(vi) $V_{PTC}$ is 600 volts AC, and $I_{PTC}$ is 1, 3, 5, 10, 15, 20, 30 or 60 amps,
(vii) $V_{PTC}$ is 12 volts DC, and $I_{PTC}$ is 1, 3, 5, 10, 15, 20, 30 or 60 amps,
(viii) $V_{PTC}$ is 24 volts DC, and $I_{PTC}$ is 1, 3, 5, 10, 15, 20, 30 or 60 amps,
(ix) $V_{PTC}$ is 60 volts DC, and $I_{PTC}$ is 1, 3, 5, 10, 15, 20, 30 or 60 amps,
(x) $V_{PTC}$ is 120 volts DC, and $I_{PTC}$ is 1, 3, 5, 10, 15, 20, 30 or 60 amps,
(xi) $V_{PTC}$ is 250 volts DC, and $I_{PTC}$ is 1, 3, 5, 10, 15, 20, 30 or 60 amps, or
(xii) $V_{PTC}$ is 600 volts DC, and $I_{PTC}$ is 1, 3, 5, 10, 15, 20, 30 or 60 amps; or (H)

(i) when the series switch is used on its own to interrupt a test circuit operating at a predetermined DC current and voltage which causes an arc to be shuck between two contacts of the series switch, a weight $M_{FIRST}$ of material is transferred from one contact to the other,
(ii) when the parallel switch is used on its own to interrupt the stone test circuit, thereby causing an arc to be struck between two contacts of the parallel switch, a weight $M_{SECOND}$ of material is transferred from one contact to the other, and
(iii) $M_{SECOND}$ is at least p times $M_{FIRST}$, where p is 1.5, preferably 4, particularly 8.

In a third aspect, this invention provides an electrical circuit which comprises (A) a source of electrical power having a voltage $V_{NORMAL}$;
(B) an electrical load; and
(C) an electrical switch arrangement which is connected in series with the power supply and the load, and which comprises
(1) a first mechanical switch,
(2) a second mechanical switch, and
(3) a PTC device;

with (a) the PTC device and second switch connected in parallel and the parallel combination connected in series with the first switch, or
(b) the PTC device and first switch connected in series and the series combination connected in parallel with the second switch;

the circuit having a normal operating condition in which both switches are closed and the circuit current is $I_{NORMAL}$; the electrical switch arrangement, when rated by a defined procedure in which both switches are operated simultaneously at the voltage $V_{NORMAL}$, having a rated current $I_{SWITCH}$ which is at least q times $I_{NORMAL}$, where q is 1, preferably 1.5, particularly 2;
the first switch, when rated on its own by the same procedure at the voltage $V_{CIRCUIT}$ having a rated current $I_{SERIES}$ which is at most r times $I_{NORMAL}$, where r is 0.9, preferably 0.75, particularly 0.5, especially 0.25;
the second switch, when rated on its own by the same procedure at a voltage $V_{SECOND}$ which is at most s times $V_{NORMAL}$, where s is 0.9, preferably 0.75, particularly 0.5, especially 0.25, having a rated current $I_{SECOND}$ which is at most $I_{NORMAL}$; and the PTC device, when tested in a test circuit whose open circuit voltage across the terminals to which the PTC is connected, were the PTC device to be removed from the test circuit, would be $V_{NORMAL}$, requiring a current, $I_{PTC}$, through it of no more than t times $I_{NORMAL}$, where t is 0.9, preferably 0.75, particularly 0.5, especially 0.25, increasing in resistance by a factor of at least 100, preferably at least 200, particularly at least 700, especially at least 1000, in a resistance increase time of at most 100 milliseconds, preferably at most 30 milliseconds, particularly at most 8 milliseconds, especially at most 5 milliseconds.

In a fourth aspect, this invention provides a method of interrupting a current $I_{CIRCUIT}$ flowing in an electrical circuit, the electrical circuit comprising (A) a source of electrical power having a voltage $V_{CIRCUIT}$, (B) a electrical load having a resistance $R_{LOAD}$; and (C) an electrical switch arrangement which is connected in series with the power supply and the load, and which comprises (1) a first mechanical switch, (2) a second mechanical switch, and (3) a PTC device;

(a) the PTC device and second switch connected in parallel and the parallel combination connected in series with the first switch, or (b) the PTC device and first switch connected in series and the series combination connected in parallel with the second switch;

the PTC device which, when tested in a test circuit whose open circuit voltage across the terminals to which the PTC is connected, were the PTC device to be removed from the test circuit, would be $V_{CIRCUIT}$, with a current through the PTC device of $I_{CIRCUIT}$, increases in resistance to at least w times $R_{LOAD}$, where w is 10, preferably 50, particularly 100, in a resistance increase time of at most 100 milliseconds, preferably at most 30 milliseconds, particularly at most 8 milliseconds, especially at most 5 milliseconds which method comprises the steps of (A) operating the second switch, and (B) 0 to 100 milliseconds after step (A) operating the first switch.

When reference is made herein to subjecting the PTC device to a current $I_{PTC}$ which is a function of m $I_{SWITCH}$ or $I_{NORMAL}$, $I_{PTC}$ is an AC current if $I_{SWITCH}$ or $I_{NORMAL}$ is an AC current, and a DC current if $I_{SWITCH}$ or $I_{NORMAL}$ is a DC current. When $I_{PTC}$ is an AC current, and the device reaches the required resistance in less than a half cycle, the current may not in fact reach the designated value; furthermore, the time taken to reach the desired resistance level will depend upon the phase angle of the current when the test begins. The times given in this specification are, therefore, measured using a power source which, if not interrupted, will reach the designated value (a so-called "prospective" current).

Although the invention is described in terms of a combination of a PTC device and mechanical switches, solid state devices having the same respective rating characteristics may be used in place of the mechanical switches in electrical switches of this invention.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each FIG. in which they appear, and in which.

DETAILED DESCRIPTION OF THE INVENTION

The two switches can be operated manually or, in one embodiment, for example when the arrangement is part of a circuit breaker operating at high voltage, in response to a signal which is via a protection relay operating at low voltage from a potential transformer or a current transformer.

Figure 1:
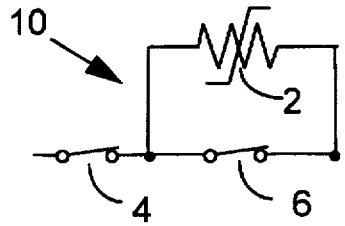
FIG. 1 shows an arrangement of two mechanical switches and a PTC device forming an electrical switch arrangement of this invention.

FIG. 1 shows an arrangement 10 of this invention which comprises a parallel combination of a PTC device 2 and a parallel switch 6, connected in series with a series switch 4. When the electrical switch arrangement 10 is operated, the parallel switch 6 opens immediately, shunting current to the parallel PTC device 2. The PTC device 2 consequently increases in resistance, thereby reducing the current and allowing the series switch 4 to open at a lower current. In some applications, the series switch 4 and the parallel switch 6 are operated simultaneously (for example with the switches ganged together). In other applications it may be beneficial to delay operating the series switch 4; such a delay may be achieved mechanically or electrically.

Figure 2:
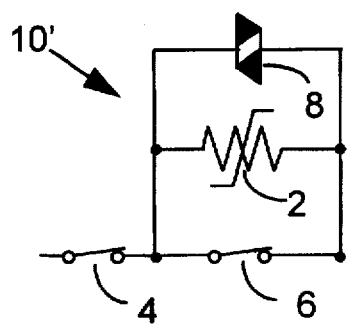
FIG. 2 shows the electrical switch arrangement of FIG. 1 with a varistor connected in parallel with the PTC device.

Other components may be combined with the arrangements of this invention to provide additional or alternative functionality. For example, in a circuit having an inductive load, a voltage surge across the PTC device 2 can result from a rapid decrease in current in the circuit as the PTC device 2 increases from a low impedance state to a high impedance state. FIG. 2 shows an arrangement which is useful under such circumstances and in which a voltage clamping device, such as a varistor 8, is connected in parallel with the PTC device 2 to limit such voltage surges. Other voltage clamping devices such as Zener diodes may be used.

Figure 3:
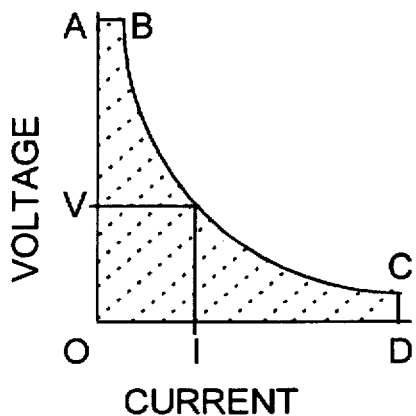
FIG. 3 is a diagrammatic plot representing voltage and current interruption rating characteristics of a mechanical switch.

FIG. 3 is a diagrammatic plot of voltage against current and shows in the shaded area OABCD the combinations of voltage and current which can be safely interrupted by a typical mechanical switch having a current rating of I amps at V volts. As shown by FIG. 3, the same device can be rated in different ways, depending on the voltage chosen; and there are maximum values of current and voltage beyond which the switch cannot be used.

Figure 4:
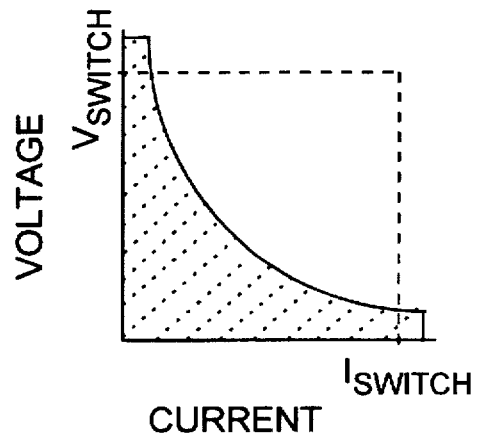
FIG. 4 is a diagrammatic plot indicating a combination of voltage and current ratings for an arrangement comprising an electrical switch arrangement of this invention.
Figure 5:
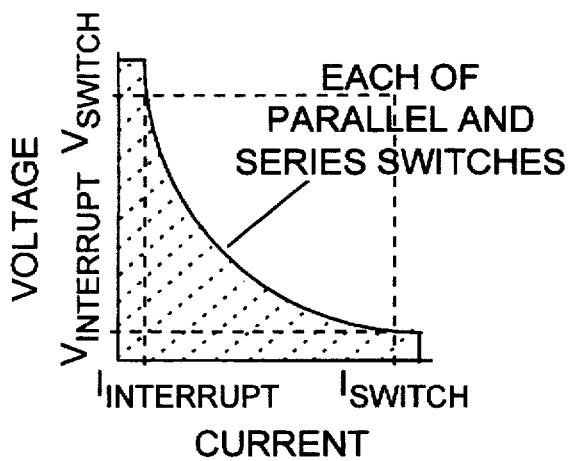
FIG. 5 is a diagrammatic plot representing how a combination of two switches having the same voltage and current rating characteristics could be used in an arrangement comprising an electrical switch arrangement of this invention.
Figure 6:
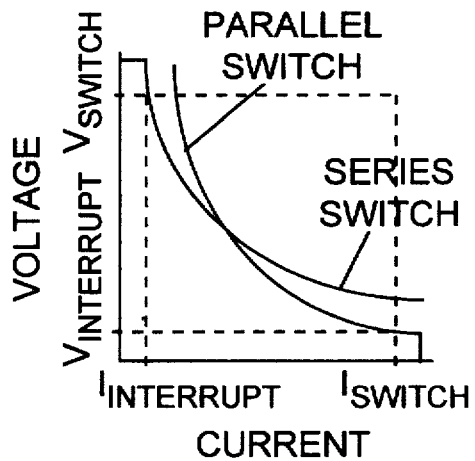
FIG. 6 is a diagrammatic plot representing how a combination of two switches having different voltage and current rating characteristics could be used in an arrangement comprising an electrical switch arrangement of this invention.

FIG. 4 is the same as FIG. 3 but also shows a combination of a voltage, designated $V_{SWITCH}$, and a current, designated $I_{SWITCH}$, of interest. A switch having a rating characteristic as depicted in FIGS. 3 and 4 would not be capable of interrupting a normal circuit current, $I_{SWITCH}$ at a normal circuit voltage, $V_{SWITCH}$. The electrical switch arrangements of this invention, with each of the switches having a rating as depicted in FIG. 5, are capable of interrupting a current equal to $I_{SWITCH}$ at a voltage equal to $V_{SWITCH}$. In the arrangements, the presence of the PTC device has the effect of dividing the interruption of the current into two separate switching operations, the first at the $I_{SWITCH}/V_{INTERRUPT}$ point, and the second at the $I_{INTERRUPT}/V_{SWITCH}$ point. An arrangement of a PTC device and mechanical switches according to FIG. 1, with the series switch and parallel switch having different rating characteristics as depicted in FIG. 6, is likewise capable of interrupting a current equal to $I_{SWITCH}$, at a voltage equal to $V_{SWITCH}$. In electrical switch arrangements comprised of mechanical switches having the rating characteristics of either FIG. 5 or FIG. 6, the parallel switch is rated to interrupt a current of $I_{SWITCH}$ at an applied voltage of $V_{INTERRUPT}$, and the series switch is rated to interrupt a current of $I_{INTERRUPT}$ at an applied voltage of $V_{SWITCH}$.

Figure 7:
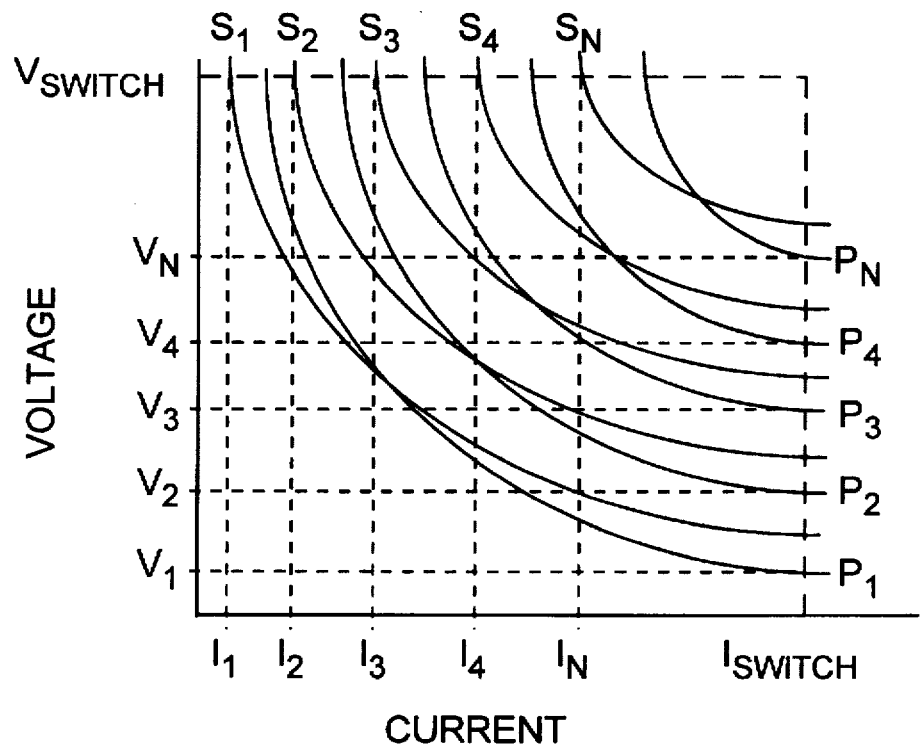
FIG. 7 is a diagrammatic plot representing how many different combinations of mechanical switches, with each such combination of switches having different voltage and current rating characteristics, could be used in an arrangement comprising an electrical switch arrangement of this invention.

The diagrammatic plots of FIGS. 5 and 6 indicate how a combination of two given switches (having identical characteristics as shown in FIG. 5, or having different characteristics as shown in FIG. 6) can be arranged with a PTC device (as shown in FIG. 1) to interrupt a current and voltage that neither switch could interrupt alone. The diagrammatic plot of FIG. 7 indicates that, for a given current and voltage combination of interest, e.g. $I_{SWITCH}$ and $V_{SWITCH}$, there are many different combinations of mechanical switches which could be arranged with a PTC device to interrupt $I_{SWITCH}$ and $V_{SWITCH}$, where none of the switches is individually capable of interrupting $I_{SWITCH}$ and $V_{SWITCH}$. For each of N combinations of series and parallel mechanical switches (designated $S_i$ and $P_i$, i=1 . . . N), the parallel switch is capable of interrupting a current $I_{SWITCH}$ at a voltage $V_i$, and the corresponding series switch is capable of interrupting a current $I_i$, at the voltage $V_{SWITCH}$. In practical terms, the goal of the electrical switch designer would be to choose the least expensive combination of mechanical switches (generally, the least expensive combination is also the smallest, but this is not necessarily the case as the switches get smaller and smaller).

Figure 8:
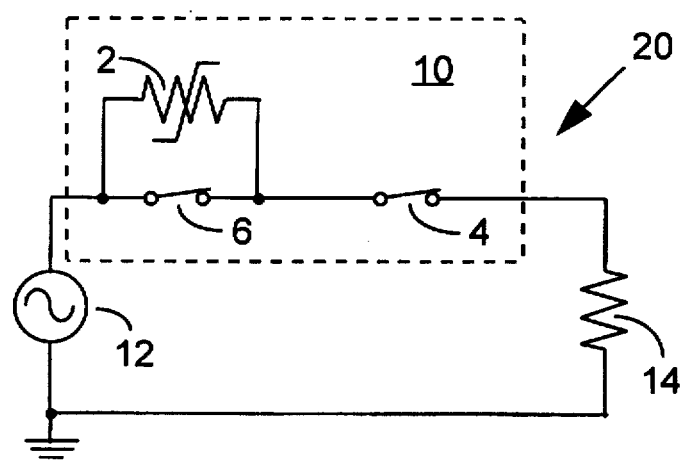
FIG. 8 shows a circuit diagram for a sample circuit employing an electrical switch arrangement of this invention.

FIG. 8 shows a circuit diagram for a circuit 20 which incorporates an electrical switch arrangement 10 of this invention with a power source 12 and a load 14. Referring to the diagrammatic plots of FIGS. 5 and 6, the normal voltage in the circuit 20 is $V_{SWITCH}$ or less, and the normal circuit current in the sample circuit 20 is $I_{SWITCH}$ or less. With the series switch 4 and the parallel switch 6 having voltage and current interruption rating characteristics as represented by FIGS. 5 or 6, neither switch alone could interrupt the current $I_{SWITCH}$ at the voltage $V_{SWITCH}$. However, the parallel switch 6 can interrupt the current $I_{SWITCH}$ at the reduced voltage $V_{INTERRUPT}$, and the series switch 4 can interrupt the reduced current $I_{INTERRUPT}$ at the voltage $V_{SWITCH}$. In the circuit 20, and with the PTC device 2 having a low temperature resistance of $R_{PTC\ LOW}$ and a high temperature resistance of $R_{PTC\ HIGH}$, the following relationships exist:

$R_{PTC\ LOW} \times I_{SWITCH} < V_{INTERRUPT}$ defines the relationship between the low resistance state resistance of the PTC device 2 and the interrupt rating of the parallel switch 6; and $V_{SWITCH}/R_{PTC\ HIGH} < I_{INTERRUPT}$ defines the relationship between the high resistance state resistance of the PTC device 2 and the interrupt rating of the series switch 4.

With these relationships, the characteristics required of the components comprising the electrical switch arrangement 10 may be defined as follows.

In an electrical switch arrangement of the invention which is rated to interrupt a current $I_{SWITCH}$ at a voltage $V_{SWITCH}$:

1. The series switch and the parallel switch, when closed, can continuously carry a current equal to or greater than $I_{SWITCH}$;
2. The PTC device has a pass current $I_{PASS}$ lower than $I_{SWITCH}$;
3. The PTC device has a trip current $I_{TRIP}$ lower than $I_{SWITCH}$ at $V_{SWITCH}$;
4. The PTC device has a low resistance of $R_{PTC\ LOW}$, and the parallel switch is rated to interrupt a current equal to $I_{SWITCH}$ at an applied voltage less than or equal to $R_{PTC\ LOW} \times I_{SWITCH}$; and
5. The PTC device has a high resistance of $R_{PTCHIGH}$, and the series switch is rated to interrupt a current equal to or less than $V_{SWITCH}/R_{PTC\ HIGH}$ at an applied voltage $V_{SWITCH}$.

In the series/parallel combination shown in FIG. 1, the series switch 4 is shown preceding the parallel combination of the PTC device 2 and the parallel switch 6 in the electrical switch arrangement 10. Although the electrical properties of the electrical switch arrangement are not dependent on such order, other considerations may dictate the placement of the series switch. For example, the order shown in FIG. 1 has the added advantage that, in applications of the electrical switch arrangement 10 for providing overcurrent protection, the series switch 4 could serve to isolate components in an overcurrent protection circuit, in addition to isolating a load, from the power source. This is particularly necessary when these components are accessible to and liable to be touched by humans.

In one specific example of the circuit of FIG. 8, both the series switch 4 and the parallel switch 6 are rated to interrupt ½ amp at 120 volts AC; the PTC device 2 is a Raychem RXE030 Polyswitch® device with a nominal resistance of 1 ohm in its low resistance state; the power supply 12 operates at 120 volts AC; and the load 14 has an impedance of 12 ohms. The normal current in the sample circuit 20 is therefore 10 amps. When both switches are operated simultaneously, the parallel switch 6 opens immediately, diverting the current through the PTC device 2. Since the resistance of the PTC device 2 is 1 ohm, the voltage across the PTC device 2 when the parallel switch 6 opens is 1 ohm×(120 volts/(1 ohm+12 ohm))

which equals approximately 9.2 volts. Thus, the parallel switch 6 has to be capable of interrupting a current slightly less than $I_{SWITCH}$ at a voltage of 9.2 volts AC, consistent with the definition above. The I²R heating of the PTC device 2 increases the resistance of the PTC device 2 to several thousand ohms in a short time, on the order of 10 milliseconds. Therefore, the series switch 4 carries a current which commences at 10 amps and reduces to a very low level, e.g. a few milliamps, in a time of the order of 10 milliseconds, at which time the series switch 4 opens, interrupting that low current at 120 volts.

If, however, in the same circuit the series switch 4 were set to delay opening, a PTC device 2 such as a Raychem RXE160 Polyswitch® device having a resistance on the order of 0.1 ohm in its low resistance state could be used. When the parallel switch 6 opens, it switches 10 amps, but only at 1 volt. The I²R heating of the PTC device 2 increases its resistance to several thousand ohms in about 3 seconds. If the series switch 4 were set to delay opening by 3 seconds, the series switch 4 would only have to switch the consequent very low current (e.g. about 0.02 amps) at 120 volts.

If, in the same circuit, the PTC device 2 were a Raychem RXE017 Polyswitch® device, having a resistance on the order of 4 ohms in its low resistance state, then its resistance would increase to several thousand ohms in about 1 millisecond at 10 amps. A 10 amp sinusoidal current would then be interrupted before reaching its peak value. If the parallel switch 6 opened as the sinusoidal current passed through zero, the PTC device 2 would limit the current through the series switch 4 before the current reached its peak. The parallel switch 6 would be rated to interrupt 10 amps at 40 volts. Theoretically, if only the switching were considered, the series switch could be rated to interrupt a very low current at 120 volts. In practice, the rating of the series switch would be determined by the requirement that the series switch, when closed, must carry the normal 10 amp current continuously.

There are compromises to be made in selecting mechanical switches and PTC devices for use in this invention. As the resistance of the PTC device in its low resistance state is increased, the PTC device tends to reach the required high resistance in a shorter time, and the delay time for opening the series switch decreases. However, as the resistance of the PTC device in the low resistance state is increased, the voltage rating of the parallel switch 6 must increase.

In the embodiment of this invention described in the examples above, the circuit components work together to provide electrical switching capabilities. The synergistic combination of a PTC device and mechanical switches can likewise be applied to circuit breakers. In a conventional circuit breaker, the signal to open can be independent of the circuit being opened, and, at high voltage, is usually via a protection relay operating at low voltage from a potential transformer (PT) or a current transformer (CT). In a circuit breaker employing the electrical switch arrangement shown in FIG. 2, both mechanical switches 4 6 begin to open simultaneously, with the parallel switch 6 connecting the PTC device 2 in series with the series switch 4. The advantages of this combination are that the PTC device 2 is in the circuit for one half cycle, and thus need not endure a large voltage for a long period of time; the PTC device 2 does not actually trip the circuit and thus operation of the circuit breaker is not dependent upon the temperature of the PTC device 2 being precisely known; the PTC device 2 need only increase in resistance, by way of example, by 2 to 3 decades to limit the fault current by 2 to 3 decades; and the fault current interrupting requirements of the mechanical contacts 4 6, are reduced by 2 to 3 decades. While this arrangement requires two mechanical contacts 4 6 instead of one, the price of two low fault current contacts is a small fraction of one high fault current contact.

Figure 9:
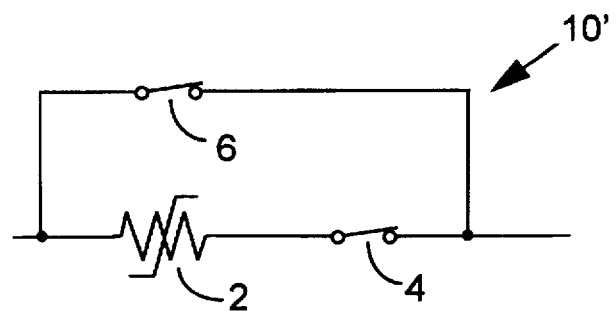
FIG. 9 shows a second arrangement of two mechanical switches and a PTC device forming an electrical switch arrangement of this invention.
Figure 10:
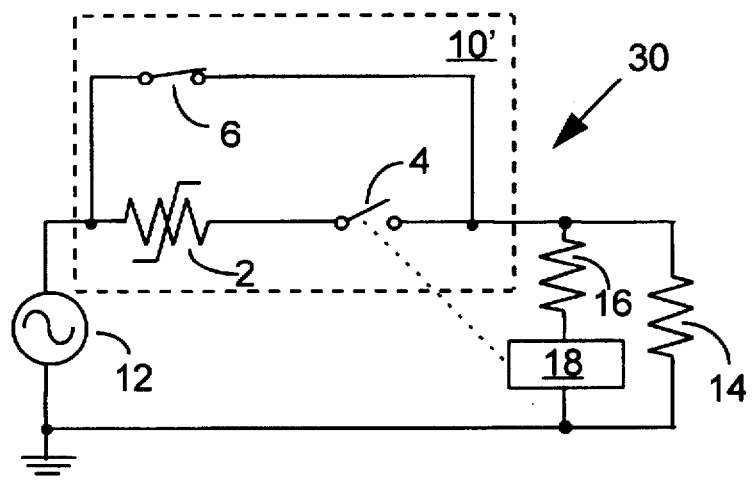
FIG. 10 shows a circuit diagram for a sample circuit employing the second arrangement of the electrical switch arrangement of this invention.

FIG. 9 shows a second arrangement of two mechanical switches and a PTC device forming an electrical switch arrangement 10' in accordance with the principles of this invention. In this second arrangement, the parallel switch 6 is in parallel with the series combination of the PTC device 2 and series switch 4. The relationships between the PTC device 2 and the series switch 4 and parallel switch 6 are the same as discussed above for the arrangement shown in FIG. 2. FIG. 10 shows a circuit diagram for a second sample circuit 30 employing the second arrangement of the electrical switch arrangement 10'. The arrangement shown in FIG. 10 also shows one way in which the series switch 4 may be arranged to delay opening. In the second sample circuit, the series switch 4 comprises a normally open set of relay contacts which are coupled with a low current relay coil 18. When the electrical switch arrangement 10' is initially closed, the parallel switch 6 closes, providing current to the load 14 and energizing the relay coil 18. The energized relay coil 18 closes the series switch 4. During normal operation, the load current flows through the parallel switch. When the electrical switch arrangement 10' is opened, the parallel switch 6 opens shunting the load current through the PTC device 2 and series switch 4. The PTC device 2 trips to its high impedance state, thereby reducing the current in the circuit 30 and deenergizing the relay coil 18. The deenergized relay coil 18 opens the series switch 4 completing the opening of the electrical switch arrangement 10'.

What is claimed is:

1. An electrical switch arrangement which comprises
   (1) a first mechanical switch,
   (2) a second mechanical switch, and
   (3) a PTC device;
with
   (a) the PTC device and second switch connected in parallel and the parallel combination connected in series with the first switch, or
   (b) the PTC device and first switch connected in series and the series combination connected in parallel with the second switch;
the arrangement, when rated by a defined procedure in which both switches are operated simultaneously to interrupt a current at a voltage $V_{SWITCH}$, having a rated current $I_{SWITCH}$;
at least one of
   (A) the first switch, when rated on its own by the same procedure at the voltage $V_{SWITCH}$, having a rated current $I_{FIRST}$ which is at most j times $I_{SWITCH}$, where j is 0.8, and
   (B) the second switch, when rated on its own by the same procedure at a voltage $V_{SECOND}$ which is at most k times $V_{SWITCH}$, where k is 0.8, having a rated current $I_{SECOND}$ which is at most $I_{SWITCH}$; and the PTC device, when tested on its own in a test circuit whose open circuit voltage across the terminals to which the PTC device is connected, were the PTC device to be removed from the test circuit; would be $V_{SWITCH}$, requiring a current, $I_{PTC}$, through it of no more than m times $I_{SWITCH}$, where m is 0.1, to cause its resistance to increase by a factor of at least 100, in a resistance increase time of at most 16 milliseconds.

2. An arrangement according to claim 1 wherein $V_{SWITCH}$ and $I_{SWITCH}$ are selected from one of the following combinations
   (1) $V_{SWITCH}$ is 12 volts AC, and $I_{SWITCH}$ is 1, 3, 5, 10, 15, 20, 30 or 60 amps;
   (2) $V_{SWITCH}$ is 24 volts AC, and $I_{SWITCH}$ is 1, 3, 5, 10, 15, 20, 30 or 60 amps;
   (3) $V_{SWITCH}$ is 60 volts AC, and $I_{SWITCH}$ is 1, 3, 5, 10, 15, 20, 30 or 60 amps;
   (4) $V_{SWITCH}$ is 120 volts AC, and $I_{SWITCH}$ is 1, 3, 5, 10, 15, 20, 30 or 60 amps;
   (5) $V_{SWITCH}$ is 250 volts AC, and $I_{SWITCH}$ is 1, 3, 5, 10, 15, 20, 30 or 60 amps;
   (6) $V_{SWITCH}$ is 600 volts AC, and $I_{SWITCH}$ is 1, 3, 5, 10, 15, 20, 30 or 60 amps;
   (7) $V_{SWITCH}$ is 12 volts DC, and $I_{SWITCH}$ is 1, 3, 5, 10, 15, 20, 30 or 60 amps;
   (8) $V_{SWITCH}$ is 24 volts DC, and $I_{SWITCH}$ is 1, 3, 5, 10, 15, 20, 30 or 60 amps;
   (9) $V_{SWITCH}$ is 60 volts DC, and $I_{SWITCH}$ is 1, 3, 5, 10, 15, 20, 30 or 60 amps;

(10) $V_{SWITCH}$ is 120 volts DC, and $I_{SWITCH}$ is 1, 3, 5, 10, 15, 20, 30 or 60 amps;

(11) $V_{SWITCH}$ is 250 volts DC, and $I_{SWITCH}$ is 1, 3, 5, 10, 15, 20, 30 or 60 amps; or

(12) $V_{SWITCH}$ is 600 volts DC, and $I_{SWITCH}$ is 1, 3, 5, 10, 15, 20, 30 or 60 amps.

3. An arrangement according to claim 2 wherein said procedure for rating each of the switches and for rating the arrangement is one of the following standards:

(1) UL20, Standard for General-Use Snap Switches, Eleventh Edition, May 25, 1995;

(2) UL508, Standard for Industrial Control Equipment, Sixteenth Edition, Sep. 20, 1994; or (3) UL1054, Standard for Special-Use Switches, Fifth Edition, May 20, 1995.

4. An arrangement according to claim 1 wherein the PTC device comprises a PTC element which is composed of a PTC conductive polymer.

5. An arrangement according to claim 4 wherein the PTC conductive polymer has a resistivity at 21° C. of less than n ohm-cm, where n is 5.

6. An arrangement according to claim 5 wherein the PTC device has a resistance of less than R ohms at 21° C., where R is 5.

7. An arrangement according to claim 1 which includes a voltage clamping device which is connected in parallel with the PTC device.

8. An arrangement according to claim 1 wherein operation of the second switch also operates the first switch.

9. An arrangement according to claim 8 wherein the resistance increase time is at most 5 milliseconds.

10. An arrangement according to claim 1 wherein operation of the second switch also operates the first switch after a delay time which is at most 100 milliseconds.

11. An electrical switch arrangement which comprises (1) a first mechanical switch, (2) a second mechanical switch, and (3) a PTC device;

with (a) the PTC device and second switch connected in parallel and the parallel combination connected in series with the first switch, or (b) the PTC device and first switch connected in series and the series combination connected in parallel with the second switch;

the switch arrangement having at least one of the following characteristics (A) the PTC device includes a PTC element which is composed of a PTC conductive polymer having a resistivity of less than 5 ohm-cm;

(B) the switches are ganged together so that the first switch can be operated at the same time as the second switch;

(C) the arrangement includes means for operating the first switch at a predetermined time which is 10 to 100 milliseconds after the parallel switch has been operated, the predetermined time being determined by the characteristics of the PTC device and the two switches;

(D) the second switch is not operated by an overcurrent through the arrangement;

(E) the second switch can be operated manually;

(F) the first switch, the second switch, the PTC device, and any other component of the switch arrangement each has a resistance which changes by a factor of at most 4, when the voltage changes from 10 to 600 volts; and (G) the PTC device, when tested on its own in a test circuit whose open circuit voltage across the terminals to which the PTC device is connected, were the PTC device to be removed from the test circuit, would be $V_{PTC}$, increasing in resistance by a factor of at least 100, in a resistance increase time of at most 30 milliseconds, with a current through the PTC device of $I_{PTC}$, where $I_{PTC}$ and $V_{PTC}$ are selected from the following combinations (i) $V_{PTC}$ is 12 volts AC, and $I_{PTC}$ is 1, 3, 5, 10, 15, 20, 30 or 60 amps, (ii) $V_{PTC}$ is 24 volts AC, and $I_{PTC}$ is 1, 3, 5, 10, 15, 20, 30 or 60 amps, (iii) $V_{PTC}$ is 60 volts AC, and $I_{PTC}$ is 1, 3, 5, 10, 15, 20, 30 or 60 amps, (iv) $V_{PTC}$ is 120 volts AC, and $I_{PTC}$ is 1, 3, 5, 10, 15, 20, 30 or 60 amps, (v) $V_{PTC}$ is 250 volts AC, and $I_{PTC}$ is 1, 3, 5, 10, 15, 20, 30 or 60 amps, (vi) $V_{PTC}$ is 600 volts AC, and $I_{PTC}$ is 1, 3, 5, 10, 15, 20, 30 or 60 amps, $V_{PTC}$ is 12 volts DC, and $I_{PTC}$ is 1, 3, 5, 10, 15, 20, 30 or 60 amps, (viii) $V_{PTC}$ is 24 volts DC, and $I_{PTC}$ is 1, 3, 5, 10, 15, 20, 30 or 60 amps, (ix) $V_{PTC}$ is 60 volts DC, and $I_{PTC}$ is 1, 3, 5, 10, 15, 20, 30 or 60 amps, (x) $V_{PTC}$ is 120 volts DC, and $I_{PTC}$ is 1, 3, 5, 10, 15, 20, 30 or 60 amps, (xi) $V_{PTC}$ is 250 volts DC, and $I_{PTC}$ is 1, 3, 5, 10, 15, 20, 30 or 60 amps, or (xii) $V_{PTC}$ is 600 volts DC, and $I_{PTC}$ is 1, 3, 5, 10, 15, 20, 30 or 60 amps; or (H)

(i) when the first switch is used on its own to interrupt a test circuit operating at a predetermined DC current and voltage which causes an arc to be struck between two contacts of the first switch, a weight $M_{FIRST}$ of material is transferred from one contact to the other, (ii) when the second switch is used on its own to interrupt the same circuit, thereby causing an arc to be struck between two contacts of the second switch, a weight $M_{SECOND}$ of material is transferred from one contact to the other, and (iii) $M_{SECOND}$ is at least p times $M_{FIRST}$, where p is 1.5.

12. An electrical circuit which comprises (A) a source of electrical power having a voltage $V_{NORMAL}$;

(B) an electrical load; and (C) an electrical switch arrangement which is connected in series with the power supply and the load, and which comprises (1) a first mechanical switch, (2) a second mechanical switch, and (3) a PTC device;

with (a) the PTC device and second switch connected in parallel and the parallel combination connected in series with the first switch, or (b) the PTC device and first switch connected in series and the series combination connected in parallel with the second switch;

the circuit having a normal operating condition in which both switches are closed and the circuit current is $I_{NORMAL}$;

the electrical switch arrangement, when rated by a defined procedure in which both switches are operated simultaneously at the voltage $V_{NORMAL}$, having a rated current $I_{SWITCH}$ which is at least q times $I_{NORMAL}$, where q is at least 1;

at least one of (A) the first switch, when rated on its own by the same procedure at the voltage $V_{NORMAL}$, having a rated current $I_{FIRST}$ which is at most r times $I_{NORMAL}$, where r is 0.5; and (B) the second switch, when rated on its own by the same procedure at a voltage $V_{SECOND}$ which is at most s times $V_{NORMAL}$, where s is 0.5, having a rated current $I_{SECOND}$ which is at most $I_{NORMAL}$; and the PTC device, when tested on its own in a test circuit whose open circuit voltage across the terminals to which the PTC device is connected, were the PTC device to be removed, would be $V_{NORMAL}$, requiring a current, $I_{PTC}$, through it of no more than t times $I_{NORMAL}$, where t is 0.25, to cause its resistance to increase by a factor of at least 100, in a resistance time of at most 8 milliseconds.

13. A circuit according to claim 12 wherein $V_{CIRCUIT}$ and $I_{NORMAL}$ are selected from one of the following combinations (1) $V_{CIRCUIT}$ is 12 volts AC, and $I_{NORMAL}$ is 1, 3, 5, 10, 15, 20, 30 or 60 amps;

(2) $V_{CIRCUIT}$ is 24 volts AC, and $I_{NORMAL}$ is 1, 3, 5, 10, 15, 20, 30 or 60 amps;

(3) $V_{CIRCUIT}$ is 60 volts AC, and $I_{NORMAL}$ is 1, 3, 5, 10, 15, 20, 30 or 60 amps;

(4) $V_{CIRCUIT}$ is 120 volts AC, and $I_{NORMAL}$ is 1, 3, 5, 10, 15, 20, 30 or 60 amps;

(5) $V_{CIRCUIT}$ is 250 volts AC, and $I_{NORMAL}$ is 1, 3, 5, 10, 15, 20, 30 or 60 amps;

(6) $V_{CIRCUIT}$ is 600 volts AC, and $I_{NORMAL}$ is 1, 3, 5, 10, 15, 20, 30 or 60 amps;

(7) $V_{CIRCUIT}$ is 12 volts DC, and $I_{NORMAL}$ is 1, 3, 5, 10, 15, 20, 30 or 60 amps;

(8) $V_{CIRCUIT}$ is 24 volts DC, and $I_{NORMAL}$ is 1, 3, 5, 10, 15, 20, 30 or 60 amps;

(9) $V_{CIRCUIT}$ is 60 volts DC, and $I_{NORMAL}$ is 1, 3, 5, 10, 15, 20, 30 or 60 amps;

(10) $V_{CIRCUIT}$ is 120 volts DC, and $I_{NORMAL}$ is 1, 3, 5, 10, 15, 20, 30 or 60 amps;

(11) $V_{CIRCUIT}$ is 250 volts DC, and $I_{NORMAL}$ is 1, 3, 5, 10, 15, 20, 30 or 60 amps; or

(12) $V_{CIRCUIT}$ is 600 volts DC, and $I_{NORMAL}$ is 1, 3, 5, 10, 15, 20, 30 or 60 amps.

14. A circuit according to claim 12 wherein the PTC device comprises a PTC element which is composed of a PTC conductive polymer having a resistivity at 21° C. of less than n ohm-cm, where n is 5.

15. A circuit according to claim 14 wherein the PTC device has a resistance of less than R ohms at 21° C., where R is 5, preferably 2, particularly 1, especially 0.25.

16. A circuit according to claim 12 which also includes a voltage clamping device which is connected in parallel with the PTC device.

17. A method of interrupting a current $I_{CIRCUIT}$ flowing in an electrical circuit, the electrical circuit comprising (A) a source of electrical power having a voltage $V_{CIRCUIT}$;

(B) an electrical load having a resistance $R_{LOAD}$; and (C) an electrical switch arrangement which is connected in series with the power supply and the load, and which comprises (1) a first mechanical switch,
(2) a second mechanical switch, and
(3) a PTC device;

with (a) the PTC device and second switch connected in parallel and the parallel combination connected in series with the first switch, or (b) the PTC device and first switch connected in series and the series combination connected in parallel with the second switch;

the PTC device and which, when tested on its own in a test circuit whose open circuit voltage across the terminals to which the PTC device is connected, were the PTC device to be removed from the test circuit, would be $V_{CIRCUIT}$ with a current through the PTC device of $I_{CIRCUIT}$, increases in resistance to at least w times $R_{LOAD}$, where w is 10, in a resistance time of at most 30 milliseconds;

which method comprises the steps of (i) operating the second switch, and
(ii) 0 to 100 milliseconds after step (i), operating the first switch.

* * * * *